United States Patent [19]

Lu et al.

[11] 4,306,111
[45] Dec. 15, 1981

[54] SIMPLE AND EFFECTIVE PUBLIC-KEY CRYPTOSYSTEM

[75] Inventors: Shyue-Ching Lu, Chung-Li, Taiwan; Lin-nan Lee, Germantown, Md.

[73] Assignee: Communications Satellite Corporation, Washington, D.C.

[21] Appl. No.: 44,288

[22] Filed: May 31, 1979

[51] Int. Cl.³ .......................... H04K 1/00; H04L 9/00
[52] U.S. Cl. ............................. 178/22.10; 178/22.11
[58] Field of Search .............................. 178/22; 375/2

[56] References Cited

U.S. PATENT DOCUMENTS 4,200,770   4/1980   Hellman et al. ..................... 375/2

OTHER PUBLICATIONS

"A Method for Obtaining Digital Signatures and Public Key Cryptosystems", *Communications of the ACM*, Feb. 1978, vol. 21, No. 2, Rivest, Shamir & Adleman, pp. 120-126.

"Hiding Information and Signatures in Trapdoor Knapsacks", Merkle et al., *IEEE Transactions on Information Theory*, vol. IT-24, No. 5, Sep. 1978, pp. 525-530.

*Primary Examiner*—Howard A. Birmiel
*Attorney, Agent, or Firm*—Sughrue, Mion, Zinn, Macpeak & Seas

[57] ABSTRACT

A public encryption key ($c_1$, $c_2$, $r$) in which $r$ is the product of two relatively prime numbers, and in which $c_1$ and $r$, as well as $c_2$ and $r$, are relatively prime numbers, is used in an encryption algorithm $$x = c_1 m_1 + c_2 m_2 \quad (\text{mod } r).$$

The decryption algorithm will be equivalent to solving simultaneous linear equations derived from the encryption algorithm. Thus, both encrypting and decrypting are quite simplified while still maintaining a high degree of security.

6 Claims, 2 Drawing Figures

SIMPLE AND EFFECTIVE PUBLIC-KEY CRYPTOSYSTEM

BACKGROUND OF THE INVENTION

This invention is relates to cryptosystems and, more particularly, to "public-key" cryptosystems. Cryptosystems in which messages are encrypted by the sender and decrypted, or deciphered, by the receiver have been well known for some time. In conventional cryptosystems, when a network user has desired to transmit a message to a particular destination, the receiver must first inform the sender of the receiver's cryptograhpic key. The encryption and decryption keys were identical and, therefore, both must be kept secret from the public, as it would otherwise be possible for the message to be intercepted and easily deciphered.

An improvement on the conventional cryptosystem was the public-key cryptosystem first introduced by W. Diffie and M. Hellman, "New Directions in Cryptography," *IEEE Transactions on Information Theory*, November 1976, pp. 644-654. In contrast to conventional cryptosystems in which encryption and decryption keys were identical, the public-key cryptosystem utilizes encryption and decryption keys which are quite distinct. The encryption keys may be available to the public so that any sender may encode and transmit his message, but only the receiver can decipher the message since he is the only person having access to the secret decryption key. In order for such a system to work, it is obviously necessary that the encryption and decryption keys be so designed that it is computationallyunfeasible to obtain the decryption key from the encryption key. This has presented considerable problems. The security of the decryption key may be assured by utilizing very complicated encryption and decryption algorithms, but this will result in a consequent decrease in both signal processing speed and transmission capacity. On the other hand, simplifying the algorithms might expose the decryption key to attack by highly sophisticated computerized cryptanalysis techniques.

Several public-key cryptosystems have been proposed. A first public-key cryptosystem is disclosed by R. Rivest, A. Shamir and L. Adleman, "A Method for Obtaining Digital Signatures and Public-Key Cryptosystems," *Communications of the ACM*, Vol. 21, No. 2, February 1978, pp. 120-126. This first system makes use of the fact that there is no kown efficient algorithm for factoring a composite number into prime factors. Both encryption and decryption algorithms use exponentiation modulo (a large composite number) and the task of cryptanalysis appears to be equivalent to factoring the large composite number. Although this first system appears elegant, its encryption and decryption operations, namely, exponentiation modulo (a large composite number), are relatively complex. Its computing time is approximately $T(r) \log_2 r$, where r is the composite number used in the system and $T(r)$ is the time required to multiply two numbers modulo r. Due to the complexity of the system and long computing-time requirements, this system is somewhat limited to low speed data rate communication systems.

A second system is disclosed by R. Merkle and M. Hellman, "Hiding Information and Receipts in Trap Door Knapsacks," paper presented at the 1977 IEEE International Symposium on Information Theory, Oct. 10-14, 1977, Cornell Universty, Ithaca, N.Y. This second system makes use of the fact that knapsacks problems are generally difficult to solve. (In this system there are two known sets of integers, but the transformation factor for converting the first set to the second set is unknown. The "knapsack" problem is to find the proper mapping between the two sets of integers by finding a subset of numbers, if there is such a subset, that adds up to a given number.) The encryption operation consists only of additions and the decryption operation consists of (multiplication of two numbers modulo (a number), comparisons and substractions. The task of cryptanalysis appears to be difficult because the knapsack problem belongs to the class of NP-complete problems, "NP-complete" being a term of art which refers to a problem the solution to which will also be the solution to all others within the same class of problems. Although both encryption and decryption operatons in this system are relatively simple, it is characterized by a message (or bandwidth) expansion factor of at least two.

A third proposed cryptosystem is disclosed by R. McEliece, "A Public-Key Cryptosystem Based on Algebraic Coding Theory," JPL Deep Space Network Progress Report 1978. This system makes use of the fact that an efficient decoding algorithm does exist for a general Goppa code, but no such algorithm is known for a general linear code. The encryption process consists of encoding with a linear code and then interfering the code word with a controlled noise generator. The decryption process is more complicated, essentially consisting of a decoding process for Goppa codes. The task of cryptanalysis appears to be difficult for this system, since the general problem of decoding a linear code is also an NP-complete problem. The disadvantage of this third system is that the implementation complexities of both the encryption process and the decryption process are very high, even with today's technology. Thus, its application is somewhat limited.

SUMMARY OF THE INVENTION

It is an object of the present invention to provide a method of protecting the privacy and security of digital data messages by the use of a public-key cryptosystem in which there is no need to transmit an encryption key via a secure channel, and the key management problem is minimized.

It is a further object of this invention to provide a simple and effective public-key cryptosystem can be implemented in a high data rate communication system.

It is still a further object of this invention to provide a method of ensuring message privacy against the most sophisticated opponents who may use the most powerful computers available to perform cryptanalysis.

It is still a further object of this invention to provide a public-key cryptosystem which is easily implemented, has a relatively small bandwidth expansion factor, is suitable for high data rate applications and, yet, is very secure against all known cryptanalysis techniques.

Briefly, these and other objects are achieved according to the present invention by utilizing a public encryption key $(c_1, c_2, r)$ in an encryption algorithm $$x = c_1 m_1 + c_2 m_2 \pmod{r},$$

where $K \pmod{r}$ is defined as the remainder of $(K/r)$. Where r is the product of two relatively prime numbers and $c_1$ and r, as well as $c_2$ and r, are relatively prime. The decryption algorithm will be the equivalent of solving linear simultaneous equations derived from the encryption algorithm. In the particular embodiment disclosed in this application, the decryption algorithm is based upon a variation of the Chinese Remaindering Theorem and makes use of the fact that no efficient algorithm is known for factoring a large composite integer. The encryption algorithm is simple and consists of two multiplications and one addition modulo- (a large number), while the decryption algorithm is also simple and consists of two modulo operations and the solving of two linear simultaneous equations with two unknowns. A suitable decryption algorithm is to use the secret decryption key ($a_{11}$, $a_{12}$, $a_{21}$, $a_{22}$, $P_1$, $P_2$) in the following computations. First, compute $$x_1 = x(\bmod p_1), \quad x_2 = x(\bmod p_2) \quad (15)$$

and then compute $$m_1 = (x_1 a_{22} - x_2 a_{12})/(a_{11} a_{22} - a_{12} a_{21})$$

$$m_2 = (x_2 a_{11} - x_1 a_{21})/(a_{11} a_{22} - a_{12} a_{21})$$

BRIEF DESCRIPTION OF THE DRAWINGS

The following invention will be more clearly understood with reference to the following description in conjunction with the accompanying drawings in which.

DETAILED DESCRIPTION OF THE INVENTION

Figure 1:
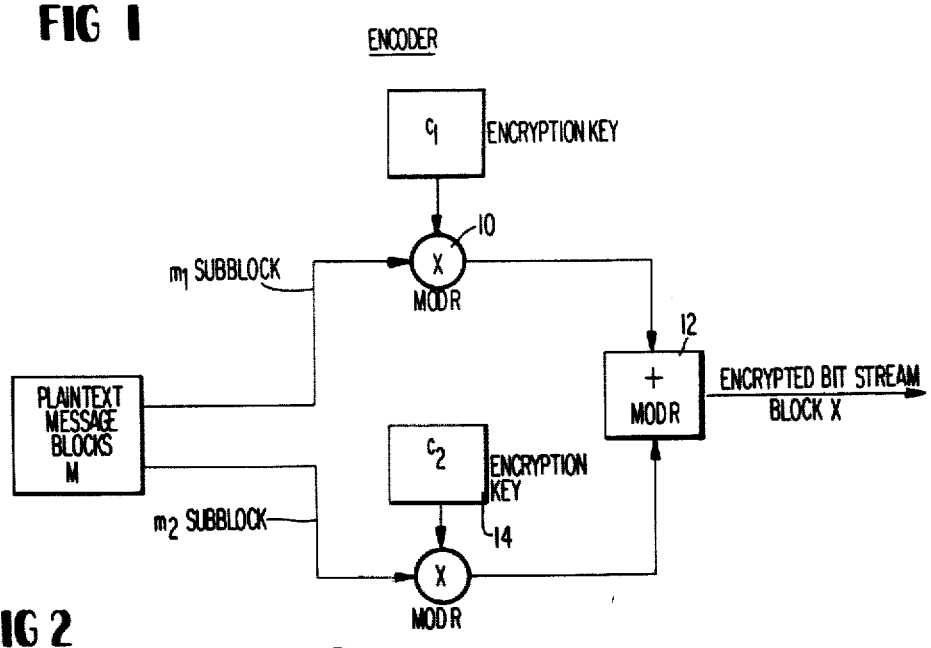
FIG. 1 is a brief block diagram of an encoder for implementing the encryption according to the present invention.

In the following description, all parameters and variables are integers, unless otherwise specified. First, the encryption and decryption algorithms will both be given and then they will both be explained in detail.

Let $m_1$ and $m_2$ represent a message, where $0 < m_1 < M_1$ and $0 < m_2 < M_2$. The present invention utilizes a public encryption key ($c_1$, $c_2$, r) to produce a cryptogram x by performing the following computation:

$$x = c_1 m_1 + c_2 m_2 \ (\bmod\ r). \quad (1)$$

The cryptogram x is decoded, or decrypted, according to the present invention by utilizing a secret decryption key ($a_{11}$, $a_{12}$, $a_{21}$, $a_{22}$, $P_1$, $P_2$) to perform the following computations. First, $$x_1 = x(\bmod p_1), \quad x_2 = x(\bmod p_2) \quad (2)$$

is computed, and then $$m_1 = (x_1 a_{22} - x_2 a_{12})/(a_{11} a_{22} - a_{12} a_{21}) \quad (3)$$

$$m_2 = (x_2 a_{11} - x_1 a_{21})/(a_{11} a_{22} - a_{12} a_{21}) \quad (4)$$

to recover the original message information $m_1$ and $m_2$.

The public encryption key is chosen so that $c_1$ and r, as well as $c_2$ and r, are relatively prime and r is the product of large prime numbers, $p_1$ and $p_2$, $$r = p_1 p_2 \quad (5)$$

Furthermore, to ensure that every message is scrambled by the encryption operation, $c_1$ and $c_2$ should be chosen such that ($c_1 + c_2$) is greater than r.

Of the six parameters in the secret decryption key, two, namely, $p_1$ and $p_2$, are prime factors of r, and the remaining four are derived from $c_1$, $c_2$ and $p_1$, $p_2$ as follows:

$$a_{11} = c_1(\bmod\ p_1),\ a_{12} = c_2(\bmod\ p_1) \quad (6)$$

$$a_{21} = c_1(\bmod\ p_2),\ a_{22} = c_2(\bmod\ p_2) \quad (7)$$

The values of these four integers must be such that $a_{11} \cdot a_{22} - a_{12} \cdot a_{21}$ does not equal zero.

The upper limits $M_1$ and $M_2$ on the integers' $m_1$ and $m_2$ representing a message must satisfy the following conditions:

$$M_1 \leq \left[ \tfrac{1}{2} \min\left( \frac{q}{a_{11}}, \frac{q}{a_{21}} \right) \right] \quad (8)$$

$$M_2 \leq \left[ \tfrac{1}{2} \min\left( \frac{q}{a_{12}}, \frac{q}{a_{22}} \right) \right] \quad (9)$$

where q = min {$p_1$, $p_2$} and [u] denotes the integer part of a real number u.

The accuracy of the decryption algorithm in correctly recovering the original information $m_1$ and $m_2$ is evidenced by the following mathematics. First, taking modulo $p_1$ on both sides of equation (1) yields:

$$x_1 = x(\bmod p_1) = c_1 m_1 + c_2 m_2 (\bmod p_1) \quad (10a)$$

$$= a_{11} m_1 + a_{12} m_2 (\bmod p_1) \quad (10b)$$

$$= a_{11} m_1 + a_{12} m_2 \quad (11)$$

Equation (10a) is obtained by realizing that $p_1$ is a factor of r and, therefore, (mod $p_1$) of any number will yield the same result as/ mod $p_1$ of (mod r) of that same number. Equation (10b) is obtained by using equation (6) and the known property of modulo operation, i.e., that taking (mod $p_1$) of the factors $c_1$ and $c_2$ prior to the multiplication operations will not effect the final result. Equation (11) follows from equations (8) and (9). In a similar fashion, one obtains $$x_2 = x(\bmod p_2) = a_{21} m_1 + a_{22} m_2 \quad (12)$$

Equations (11) and (12) are a pair of linear simultaneous equations in which the only two unknowns are $m_1$ and $m_2$. Since, as described above, $a_{11} \cdot a_{22} - a_{12} \cdot a_{21}$ does not equal zero, the two unknowns can be determined by solving the simultaneous linear equations in a well known manner, and the results are given in equations (3) and (4).

Selection of the encryption and decryption keys in the cryptosystem according to the present invention are relatively simple. First, large prime numbers for $p_1$ and $p_2$ can be selected in a variety of ways. One suitable technique would be to use the efficient "probabilistic" algorithm disclosed by R. Solovay and V. Strasen, "A Fast Monte-Carlo Test for Primality," *SIAM Journal on Computing*, March 1977, pp. 84–84. Once $p_1$ and $p_2$ are specified, $c_1$ and $c_2$ can be easily computed as follows:

First, select $a_{11}$, $a_{12}$, $a_{21}$ and $a_{22}$ such that $a_{11} \cdot a_{22} - a_{12} \cdot a_{21}$ does not equal zero. When selecting these integers the selections should be made such that the upper limits $M_1$ and $M_2$ on the integers $m_1$ and $m_2$ representing the message satisfy conditions (8) and (9) given above.

The next step is to compute $b_1$ and $b_2$ such that $$b_1 p_1 + b_2 p_2 = 1 \tag{13}$$

by using a variation of the Euclidean algorithm. There will also be some integers $b_1$ and $b_2$ which satisfy equation (13) since $p$ and $p_2$ are relatively prime, i.e., they share no common factors. The values $c_1$ and $c_2$ are then computed according to the following formulas:

$$c_1 = (a_{21} - a_{11})b_1 p_1 + a_{11} \tag{14a}$$

$$= (a_{11} - a_{21})b_2 p_2 + a_{21} \tag{14b}$$

$$c_2 = (a_{22} - a_{12})b_1 p_1 + a_{12} \tag{15a}$$

$$= (a_{12} - a_{22})b_2 p_2 + a_{22} \tag{15b}$$

Equations (14a) and (14b) are obtained by multiplying both sides of equation (13) by $(a_{21} - a_{11})$ and then re-arranging terms. Similarly, equatons (15a) and (15b) are derived from equation (13) by multiplying both sides of that equation by $(a_{22} - a_{12})$ and then re-arranging the terms.

Having thus chosen the numbers $p_1$, $p_2$, $a_{11}$, $a_{12}$, $a_{21}$ and $a_{22}$ and having calculated integers $c_1$ and $c_2$, r can be computed from equation (5) to complete the encryption key $(c_1, c_2, r)$, and the chosen values will constitute the decryption key.

If the decryption key is kept secret, the above-disclosed cryptosystem can provide a very high level of security. Note that while the encryption key $(c_1, c_2, r)$ is put on the public file, no effective algorithm is now known which will find the secret decryption key without first finding the prime factors phd 1 and $p_2$ of r. Factorization of a large composite integer is quite difficult, and the most efficient algorithm known today, disclosed by D. Knuth, *Seminumerical Algorithms: The Art of Computer Programming*, Vol. 2, Addison Vesley, Reading, Mass. (1969), would require approximately $$e^{\sqrt{ln(r) \cdot ln(ln(r))}}$$

steps in order to determine the factors of r. For a computer capable of one operation per microsecond and an r having 100 decimal digits, it would take the computer approximately 74 years to determine the factors $p_1$ and $p_2$. If r is 200 decimal digits, it would take approximately $3.8 \times 10^9$ years.

Further, cryptanalysis is techniques would not be effective in breaking the cryptosystem according to the present invention. Two conventional cryptanalysis techniques are the "known plain text attack" and the "chosen plain text attack." In the former, the data in the encoded message is somehow known ahead of time and compared with the encryption in order to determine the relationship. In the latter, the text of the message is chosen by the person attempting to break the code, thus permitting manipulation of the messages and providing the best chance of success. Neither of these techniques would appear useful in breaking the cryptosystem according to the present invention, since the cryptogram is merely the result of a modulo operation. A further cryptanalysis technique would be an exhaustive search of $a_{11}$, $a_{12}$, $a_{21}$ and $a_{22}$ by a trial-and-error method, but this can easily thwarted by chosing each of these parameters to have at least 16 bits.

The cryptosystem does exhibit a small bandwidth expansion factor due to the restrictions on integers representing the message, but the expansion factor is relatively small. The expansion factor characteristic of the present invention will be approximately $$1 + \frac{2(1 + \log a)}{\log r}$$

where a is the largest of the four $a_{ij}$'s, and the base of the logarithm is 2. When r is 320 bits and a is 16 bits, the expansion factor is approximately $1 + 2(1 + 16)/320$, or about 1.1.

As will be obvious from the above description of the invention, the cryptosystem according to the present invention is simpler than the first-mentioned prior art system yet affords the same level of security, has a much smaller message expansion factor than the second-mentioned system, exhibits a higher level of security with simpler encryption and decryption operations than in the third-mentioned system, is secure against plain text and trial-and-error attacks by the use of sophisticated computers and, finally, is suitable of high data rate applications. The advantages of these features are apparent.

Shown in FIG. 1 is an encoder which may be used to perform the encryption described above. The message subblock $m_1$ is multiplied by the integer $c_1$ in multiplier 10 which may also at that time take the (mod r) value of the product and supply it as one input to an adder 12. The message sublock $m_2$ is similarly multiplied by integer $c_2$ in a multiplier 14 which also may take the (mod r) value of the product, and this product is supplied as the other input to the adder 12. The adder 12 will sum the two products and provide the encrypted bit stream x as the output. It should be noted that the results will be the same if the outputs from the multipliers 10 and 14 are the (mod r) values of their respective products and the addition is performed in modulo r, or if the products are themselves supplied to the adder which computes the sum and then takes the (mod r) value of the sum.

In decoding, the entire bit stream block x is supplied to the input 20. The modulo operator 22 divides the encoded values by $p_1$ and provides the remainder of this operation at its output, i.e., it provides (mod $p_1$) value of the message at its output. This is then multiplied in a multiplier 24 by the integer $a_{22}$ and provided as one input to a subtraction circuit 26. Simultaneously, the bit stream 20 is also fed through a modulo operator 28 in multiplier 30 which functions in the same manner as their counterparts 22 and 24 except that the values used are $p_2$ and $a_{12}$, respectively. The subtractor 26 subtracts the input 34 from the input 32 and then divides the subtraction result by a pre-computed denominator in divider 36 to provide at its output the decoded $m_1$ information subblock.

The encoded bit stream x is simultaneously supplied in parallel to modulo operators 22a and 28a which are identical to the above-described operators 22 and 28, respectively. The outputs of these operators are then supplied to multipliers 24a and 30a which are the same as the multipliers 24 and 30 except that the integer values are $a_{21}$ and $a_{11}$, respectively. Subtraction circuit 26a and divider 36a are identical to their counterparts above-described, and the output of the divider 36a is the decoded $m_2$ information subblock.

Figure 2:
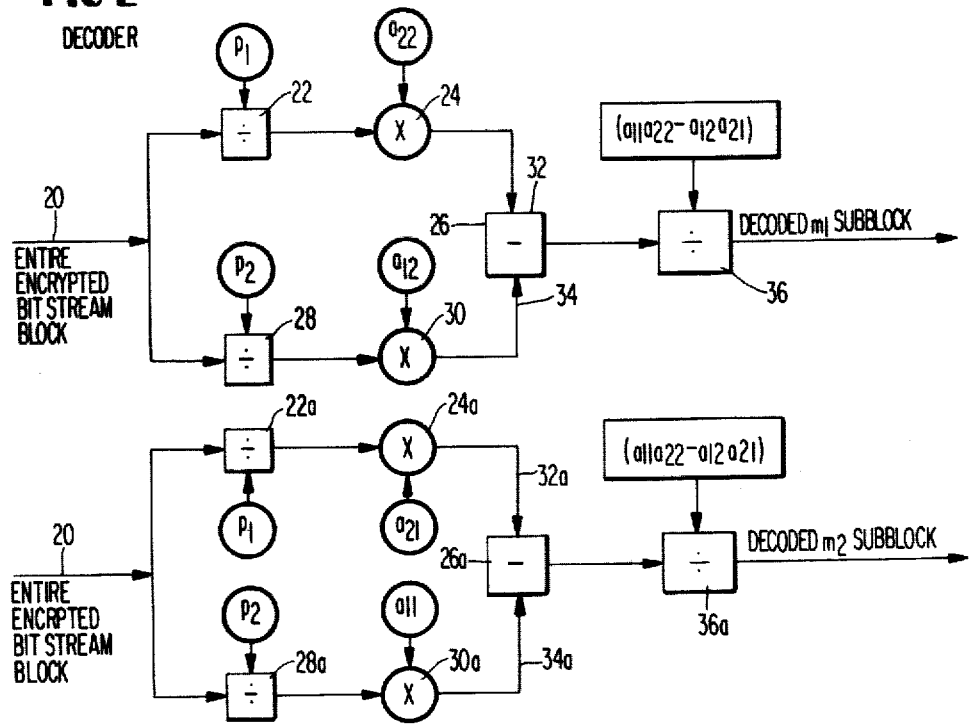
FIG. 2 is a brief block diagram of a decoder for implementing decryption in the system according to the present invention.

The hardware shown in FIGS. 1 and 2 is quite simple and is a further advantage of this cryptosystem. It should be noted, however, that other decryption techniques and corresponding decryption hardware could be employed without departing from the scope of the present invention. The above-described decryption technique has been found to exhibit the best performance. Alternative methods of design would be possible as long as the following principles are followed:

(1) The encryption algorithm should be in the form given in equation (1) in which a public encryption key $(c_1, c_2, r)$ is such that r is the product of two relatively prime numbers and $c_1$ and r as well as $c_2$ and r are relatively prime, and (2) The decryption algorithm is the equivalent of solving two linear simultaneous equations derived from the encryption algorithm.

It should also be appreciated that, although the above-described cryptosystem utilized only two information integers $m_1$ and $m_2$, any number of integers could be used. Of course, in order to decode the cryptogram, it is necessary to utilize a number of linear equations equal to the number of unknown variables. In using larger numbers of variables $m_n$, the hardware complexity increases substantially and, therefore, it is preferable to use only two integers $m_1$ and $m_2$.

One variation would be to divide the message into only successive integers $m_1$ rather than $m_1$ and $m_2$ as described above. A random noise generator could be used to supply $m_2$ in equation (1) and it would then only be necessary to solve for $m_1$. This, however, is less preferable than the use of both $m_1$ and $m_2$ as information integers, since the transmission capacity would be decreased without a very significant decrease in system complexity.

What is claimed is:

1. A method of securely communicating over an insecure communication channel of the type wherein an original information signal is transformed into an encoded information signal according to an encryption algorithm, transmitted over said information channel between a transmitter and a receiver, received by said receiver and decoded to obtain said original information signal, said original information signal comprising at least two integers $m_1$ and $m_2$ where at least $m_1$ represents information and $0 < m_1 < M_1$ and $0 < m_2 < M_2$, where $M_1$ and $M_2$ are integers, said method comprising the steps of:

producing a cryptogram x from said original information signal and a public encryption key $(c_1, c_2 r)$, where $c_1$, $c_2$ and r are all integers, r is the product of two relatively prime numbers $p_1$ and $p_2$, and $c_1$ and r are well as $c_2$ and r are relatively prime, said cryptogram x being defined by:

$$x = c_1 m_1 + c_2 m_2 \quad (\mathrm{mod}\ r)$$

where $c_1 m_1 + c_2 m_2$ (mod r) is defined as the remainder of $(c_1 m_1 + c_2 m_2)/r$;

transmitting said cryptogram x as said encoded information signal from said transmitter to said receiver;

receiving said encoded information signal at said receiver;

generating two simultaneous linear equations from said encryption algorithm; and solving said two simultaneous linear equations using said received cryptogram x, to thereby obtain said integers $m_1$ and $m_2$ of said original information signal.

2. The method according to claim 1, wherein said at least two simultaneous linear equations are:

$$x(\mathrm{mod}\ p_1) = a_{11} m_1 + a_{12} m_2$$

$$x(\mathrm{mod}\ p_2) = a_{21} m_1 + a_{22} m_2.$$

3. The method according to any one of claim 1 or 2, wherein only two integers $m_1$ and $m_2$ are used in the encryption algorithm.

4. The method as defined in claim 1, wherein said two simultaneous linear equations are generated in accordance with said encryption algorithm and a secret decryption key $(a_{11}, a_{12}, a_{21}, a_{22}, p_1, p_2)$ where $a_{11}, a_{12}, a_{21}$ and $a_{22}$ are integers.

5. The method as defined in either of claim 4 or 2, further comprising, prior to said producing step, the step of selecting said secret decryption key by:

selecting two relatively prime numbers $p_1$ and $p_2$; and
selecting values of $a_{11}, a_{12}, a_{21}$ and $a_{22}$, such that $$a_{11} a_{22} - a_{12} a_{21} = 0$$

and $$M_1 \leq \left[ \tfrac{1}{2} \min \left( \frac{q}{a_{11}}, \frac{q}{a_{21}} \right) \right]$$

$$M_2 \leq \left[ \tfrac{1}{2} \min \left( \frac{q}{a_{12}}, \frac{q}{a_{22}} \right) \right]$$

where q = min and denotes the integer part of a real number u, said selected values $a_{11}, a_{12}, a_{21}, a_{22}, p_1$ and $p_2$ comprising said description key.

6. The method as defined in claim 5, further comprising, subsequent to said step of selecting said secret decryption key, the steps of:

selecting integers $b_1$ and $b_2$ satisfying the equation $b_1 p_1 + b_2 p_2 = 1$;

calculating $c_1$ and $c_2$ according to:

$$c_1 = (a_{21} - a_{11}) b_1 p_1 + a_{11}$$
$$\phantom{c_1} = (a_{11} - a_{21}) b_2 p_2 + a_{21}$$
$$c_2 = (a_{22} - a_{12}) b_1 p_1 + a_{12}$$
$$\phantom{c_2} = (a_{12} - a_{22}) b_2 p_2 + a_{22};\ \text{and}$$

calculating $r = p_1 p_2$, whereby said encryption key $(c_1, c_2, r)$ is obtained.

* * * * *